(12) United States Patent  (10) Patent No.: US 9,321,008 B2
Han et al.  (45) Date of Patent: Apr. 26, 2016

(54) DEVICE FOR DISCHARGING EXHAUST GAS FROM DIESEL ENGINE, HAVING AMMONOLYSIS MODULE

(75) Inventors: Hyun Sik Han, Kyeonggi-Do (KR); Eun Seok Kim, Kyeonggi-Do (KR); Jae Woo Kim, Kyeonggi-Do (KR)

(73) Assignee: Heesung Catalysts Corporation, Kyeonggi-Do (KP)

( * ) Notice: Subject to any disclaimer, the term of this patent is extended or adjusted under 35 U.S.C. 154(b) by 141 days.

(21) Appl. No.: 13/642,373

(22) PCT Filed: Apr. 20, 2011

(86) PCT No.: PCT/KR2011/002802
§ 371 (c)(1),
(2), (4) Date: Dec. 17, 2012

(87) PCT Pub. No.: WO2011/132918
PCT Pub. Date: Oct. 27, 2011

(65) Prior Publication Data
US 2013/0115141 A1 May 9, 2013

(30) Foreign Application Priority Data

Apr. 21, 2010 (KR) .................. 10-2010-0036707

(51) Int. Cl.
*B01D 53/00* (2006.01)
*B01D 53/34* (2006.01)
(Continued)

(52) U.S. Cl.
CPC ........ *B01D 53/9431* (2013.01); *B01D 53/9477* (2013.01); *F01N 3/035* (2013.01); *F01N 3/0842* (2013.01); *F01N 3/106* (2013.01); *F01N 3/2066* (2013.01); *F01N 13/009* (2014.06); *B01D 2251/202* (2013.01); *B01D 2251/208* (2013.01);
(Continued)

(58) Field of Classification Search
None
See application file for complete search history.

(56) References Cited

U.S. PATENT DOCUMENTS 8,071,037 B2  12/2011  Harinath
2006/0201139 A1  9/2006  Khadiya
2008/0127638 A1  6/2008  Vaarkamp et al.

FOREIGN PATENT DOCUMENTS

JP  02198638  8/1990
JP  05329372  12/1993
(Continued)

OTHER PUBLICATIONS

International Search Report for Application No. PCT/KR2011/002802 dated Dec. 28, 2011.
(Continued)

*Primary Examiner* — Walter D Griffin
*Assistant Examiner* — Jelitza Perez
(74) *Attorney, Agent, or Firm* — Meunier Carlin & Curfman LLC

(57) ABSTRACT

The present invention relates to a device for discharging exhaust gas from a diesel engine by using hydrogen gas, which includes an ammonolysis module. More specifically, the present invention relates to a device for purifying exhaust gas of a diesel engine, wherein the device for discharging exhaust gas from a diesel engine comprises a DOC-DPF-LNT module formed in the downstream of diesel engine in a serial mode, further includes an ammonolysis module; the device for discharging exhaust gas from a diesel engine comprises a DOC-DPF-HC-SCR module formed in the downstream of diesel engine in a serial mode, further includes an ammonolysis module; and the device comprises an LNT-DPF module and an ammonolysis module.

5 Claims, 4 Drawing Sheets

(51) Int. Cl.

| | | |
|---|---|---|
| *B01D 53/94* | (2006.01) | |
| *F01N 3/035* | (2006.01) | |
| *F01N 3/08* | (2006.01) | |
| *F01N 3/10* | (2006.01) | |
| *F01N 3/20* | (2006.01) | |
| *F01N 13/00* | (2010.01) | |

(52) U.S. Cl.
CPC ..... *B01D 2251/2067* (2013.01); *B01D 2255/91* (2013.01); *B01D 2258/012* (2013.01); *F01N 2240/40* (2013.01); *F01N 2610/02* (2013.01); *F01N 2610/03* (2013.01); *F01N 2610/08* (2013.01); *Y02T 10/24* (2013.01)

(56) References Cited

FOREIGN PATENT DOCUMENTS

| KR | 20-0151543 Y1 | 7/1999 |
|---|---|---|
| KR | 20-0187104 Y1 | 6/2000 |
| KR | 10-1999-0009068 A | 9/2006 |
| WO | 0187770 | 11/2001 |
| WO | WO2007/004774 A1 | 1/2007 |

OTHER PUBLICATIONS

Office Action for U.S. Appl. No. 13/056,284 dated Mar. 14, 2013.
Ganley et al. "Development of a microreactor for the production of hydrogen from ammonia." Journal of Power Sciences, 2004, 137, 53-61.
Hauck et al. "Surface chemistry and kinetics of the hydrolysis of isocyanic acid on anatase." Applied Catalysis B: Environmental, 2007, 70, 91-99.
Koebel et al. "Thermal and hydrolytic decomposition of urea for automotive selective catalytic reduction systems: Thermochemical and practical aspects." Ind. Eng. Chem. Res. 2003, 42, 2093-2100.
Li et al. "Ammonia decomposition over Ru and Ni catalysts supported on fumed $SiO_2$, MCM-41, and SBA-15." Journal of Catalysis, 2005, 236, 181-189.
Lundstrom et al. "Urea thermolysis studied under flow reactor conditions using DSC and FT-IR." Chemical Engineering Journal, 2009, 150, 544-550.
Yim et al. "Decomposition of urea into $NH_3$ for the SCR process." Ind. Eng. Chem. Res. 2004, 43, 4856-4863.
Yin et al. "Investigation on the catalysis of COx-free hydroden generation from ammonia." Journal of Catalysis, 2004, 224, 384-396.
Zheng et al. "Effects of $CeO_2$ addition on $Ni/Al_2O_3$ catalysts for the reaction of ammonia decomposition to hydrogen." Applied Catalysis B: Environmental, 2008, 80, 98-105.

dified a urea-SCR module applied presently so as to hydrolyze ammonia produced from urea and introduce the resulting hydrogen to the above modules respectively or alternatively. As a consequence, we have identified to solve former problems and completed the present invention successfully.

DEVICE FOR DISCHARGING EXHAUST GAS FROM DIESEL ENGINE, HAVING AMMONOLYSIS MODULE

BACKGROUND OF THE INVENTION

1. Field of the Invention

The present invention relates to a device for post-processing exhaust gas from a diesel engine, more particularly to a device for discharging exhaust gas from a diesel engine, which improves a capacity for purifying exhaust gas from a diesel engine, especially capacity for purifying nitrogen oxides, by using hydrogen gas generated in an ammonolysis module.

2. Description of the Related Art

Generally, a diesel engine that has inherently high heat efficiency (i.e. high fuel economy) and high torque at a low speed, is useful for a device providing driving force to a vehicle, and may be driven at a high A/F (air to fuel) ratio under a lean condition of fuel mixture. For this reason, the diesel engine exhibits high HC and CO conversion ratios, but exhaust gas from the diesel engine discharges $NO_x$ and particulates highly. Both the $NO_x$ (nitrogen oxides) and particulates are components of diesel exhaust gas that are difficult to convert into harmless material. Nevertheless, the emission standards related thereto are increasingly restricted because of associated environmental problems.

In order to reduce particulates, methods for post-processing them are being focused upon a catalyzed diesel particulate filter (CDPF or DPF) also called catalyzed soot filter (CSF). Broadly speaking, these filters are constituted to capture and recycle particulates from exhaust gas. First in order to capture particulates, various filter systems applicable for absorbing particulates from exhaust gas of a diesel engine have been disclosed and includes honeycomb wall-flow filter and the like (See FIG. 1). The resulting particulates should be combusted (recycled) in the filter continuously or periodically, after being captured and accumulated within a filter. Therefore, catalysts are provided for the filter in order to decrease a temperature of combustion and also made to a catalyzed diesel particulate filter. Usually, the CDPF or CSF can decrease 90% or more of particulates as well as give passive combustion of particulates after being accumulated and filter recycling thereafter. In the DPF, carbon particulates can be combusted at 550° C., but oxidized even at 250° C. under the presence of $NO_x$. Therefore, in order to produce $NO_x$ and lower the temperature of recycling, precious metals including Pt and/or Pd are loaded on the DPF since they oxidize nitrogen oxides to $NO_2$ in exhaust gas discharged from a diesel engine. Accordingly, an additional module generally called diesel oxidation catalyst (DOC) may be also installed at the front end. When passing through the DOC, the resulting gas discharged from a diesel engine can generate $NO_2$ as a by-product that can oxidize HC (hydrocarbon) and CO and coincidentally decrease the temperature of combustion in a DPF installed at the posterior end.

For such a filter recycling, carbon particulates can be oxidized at a relatively low temperature, for example at 200° C. or less, when hydrogen gas is sprayed at the front end of the CDPF or CSF additionally. In the meantime, when hydrogen is injected at the front end of the DOC, DOC performance is also improved due to decrease of LOT and further, desulfuration efficiency becomes better.

As disclosed in prior arts, various methods have been attempted to remove nitrogen oxides from exhaust gas of diesel engines, for example catalytic systems including selective catalytic reduction (SCR) or lean $NO_x$ trap (LNT). Especially in SCR systems, a urea-SCR($NH_3$-SCR) module produces harmless nitrogen components by a process comprising steps of: spraying urea within a storage container (tank) installed on a transport means toward the upstream of discharge gas; then, converting the urea to ammonia by using a hydrolytic catalyst; and reducing nitrogen oxides (NO, $NO_2$) by applying the ammonia as a reducing agent. FIG. 2 shows an outlined diagram of the system for post-processing exhaust gas which comprises a urea-SCR module. FIG. 3 shows a detailed diagram of a urea-SCR module.

In addition, a so-called HC-SCR module is disclosed. Particularly, it is a catalytic converter that lessons $NO_x$ selectively by HC (hydrocarbon) as a reducing agent and the HC reacts with $NO_x$ selectively to produce $N_2$, $CO_2$, and water ($H_2O$). Furthermore, in recent studies, it is elucidated that the selective reduction is improved highly when hydrogen is sprayed at the front end of a HC-SCR module.

Moreover, LNT (lean $NO_x$ trap) is known as a system for reducing nitrogen oxides. It is embodied with a mechanism that traps nitrogen oxides at a lean area and releases them at a rich area so as to convert them to nitrogen and carbon dioxide by using catalysts. This $NO_x$ trap is advantageous to have a good durability at a high temperature. However, it is problematic to poison by sulfur components within fuel and have a low recycling efficiency by HC and CO when being recycled at a rich spike.

SUMMARY OF THE INVENTION

The present inventors has recognized that when hydrogen gas is introduced according to requirements, DOC, DPF and HC-SCR (or LNT) modules can decrease LOT of conventional DOCS respectively, improve desulfuration efficiencies, lower recycling temperatures of DPF, and improve HC-SCR (or LNT) efficiencies as a selective module for removing nitrogen oxides. Then, we have modified a urea-SCR module applied presently so as to hydrolyze ammonia produced from urea and introduce the resulting hydrogen to the above modules respectively or alternatively. As a consequence, we have identified to solve former problems and completed the present invention successfully.

DETAILED DESCRIPTION OF THE INVENTION

The present invention relates to devices for discharging exhaust gas from a diesel engine, including an ammonolysis module, more particularly to devices for discharging exhaust gas from a diesel engine, which are composed of a DOC-DPF-LNT module serially in the downstream of diesel engine and further comprises an ammonolysis module. In addition, the present invention relates to devices for discharging exhaust gas from a diesel engine, which are composed of a DOC-DPF-HC-SCR module serially in the downstream of diesel engine and further comprises an ammonolysis module. In addition, the present invention relates to devices for purifying exhaust gas from a diesel engine, which is comprised of an LNT-DPF module and an ammonolysis module.

According to the present invention, the ammonolysis module can be a catalytic system that is coated with catalysts for urea-hydrolysis and ammonolysis and formed in a honeycomb shape, but not limited to. The ammonia is provided as an ammonia precursor, for example in a form kept in a transportable storage container, such as urea, isocyanic acid and the like. The precursors are hydrolyzed to produce ammonia. Accordingly, the ammonolysis module can be made of single or two more systems including a catalyst for hydrolysis of precursors and a catalyst for ammonolysis together in a mixture, or including them independently.

Effects

The systems of the present invention can be effective to decrease LOT at the inside of DOC module, lower a recycling temperature of DPF, and decrease the content of precious metals used in the modules. Moreover, they can acquire a desulfuration effect because of using hydrogen as a reducing agent and improve a reduction efficiency of nitrogen oxides in LNT or HC-SCR modules. Above all, the systems of the present invention can be installed within former devices for discharging gas equipped with a urea-SCR module, if being modified. Therefore, the features of the present invention can be embodied simply without changing existing systems.

DESCRIPTION OF THE PREFERRED EMBODIMENTS

Figure 4:
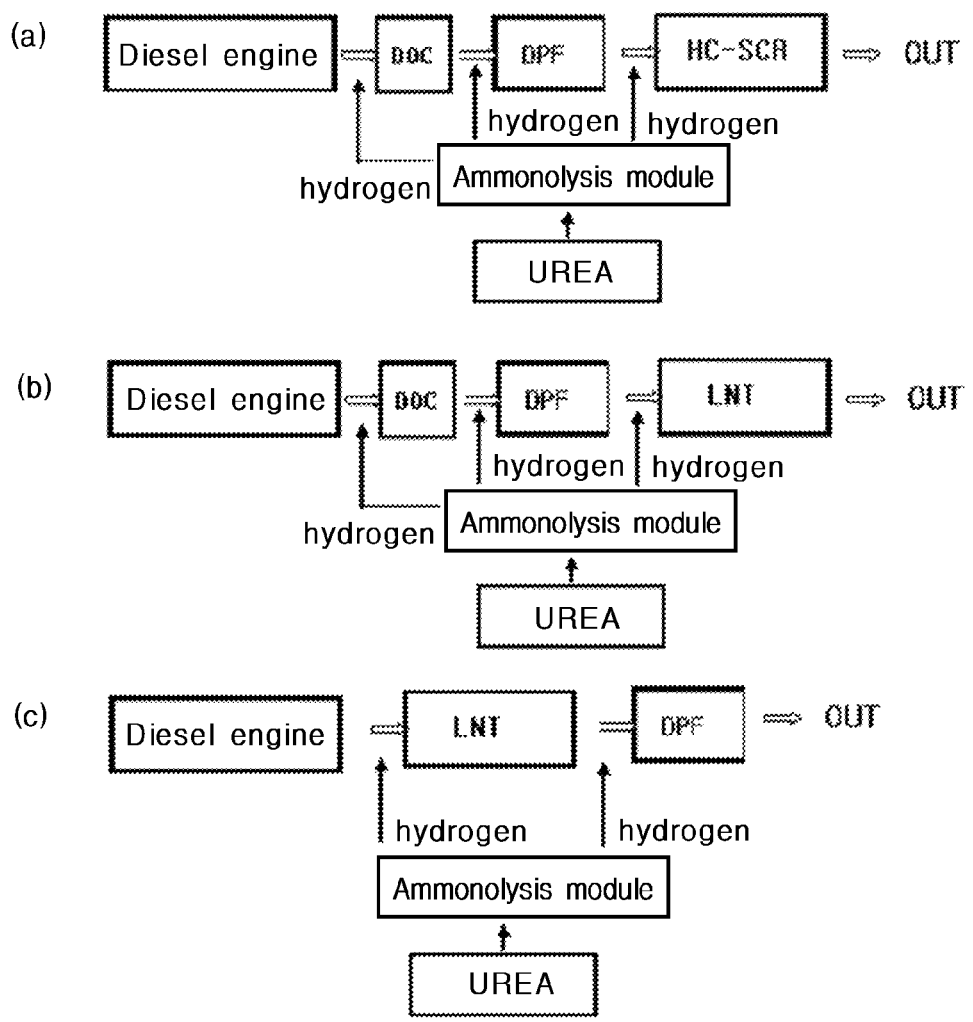
FIG. 4 shows the systems for discharging exhaust gas from a diesel engine according to the present invention.

The devices for discharging exhaust gas according to the present invention are illustrated in FIG. 4. That is to say, they are systems comprised of DOC-DPF-LNT (or HC-SCR) or LNT-DPF module arrangements.

In the present invention, the 'downstream' of exhaust gas refers to a flow direction of exhaust gas against one reference element. The 'module' refers to a minimal unit operating one function. For example, 'DPF' module refers to a filter device for trapping particulates discharged from a diesel engine and operating a recycling function, if necessary. 'HC-SCR module' refers to a carrier coated with a so-called SCR catalyst in order to remove $NO_x$ by using hydrocarbon (HC) as a reducing agent. In addition, 'LNT module' refers to a carrier coated with catalysts that traps $NO_x$ at a lean area, adsorbs $NO_x$ and stores it, purifies the resulting $NO_x$ when spraying fuel or reaching a rich spike, and coincidentally recovers a function of $NO_x$ trap.

The present invention provides the devices for discharging exhaust gas from a diesel engine, which are serially composed of diesel oxidation catalyst module, catalyzed diesel particulate filter module and HC-SCR module (or LNT module) placed serially in the downstream of exhaust gas from the catalyzed diesel particulate filter module, wherein hydrogen is injected at the front end of diesel oxidation catalyst module, catalyzed diesel particulate filter module and HC-SCR module (or LNT module) respectively or alternatively. The hydrogen is produced from an ammonolysis unit and the ammonia is derived from ammonia precursors, particularly by hydrolysis of urea solution.

In addition, the present invention provides the devices for discharging exhaust gas from a diesel engine, which is serially composed of LNT module and catalyzed diesel particulate filter module, wherein hydrogen is injected at the front ends of LNT module and catalyzed diesel particulate filter module respectively or alternatively. The hydrogen is produced from an ammonolysis unit and the ammonia is derived from hydrolysis of ammonia precursors.

Hereinafter, above-mentioned elements are described more clearly. These elements have been already disclosed and in the present invention, the components disclosed in prior arts are combined. In order to attain the objects described above, hydrogen generated by an ammonolysis module is injected to the front ends of modules respectively or alternatively or to those of all modules. Electronic methods for adjusting hydrogen injected to each module, related methods for monitoring and controlling temperatures and other methods have been already disclosed a lot and will not be described hereinafter.

1) Diesel Oxidation Catalyst Module (DOC)

As disclosed in prior arts, DOC is a module coated with oxidation catalysts that decrease HC and CO released from a diesel engine. Conventionally, it is comprised of a system in which platinum and/or palladium are loaded on a matrix and then, coated on a porous ceramic carrier such as cordierite.

The diesel oxidation catalyst module is installed in between diesel engine and DPF module through a tube of exhaust gas. According to the present invention, the hydrogen gas introduced may lessen LOT at the inside of DOC and thereby improve the oxidation condition of HC and CO. This results in an exothermic reaction and smoothly promotes DPF recycling in the downstream.

2) Catalyzed Diesel Particulate Filter Module (CDPF or DPF)

Figure 1:
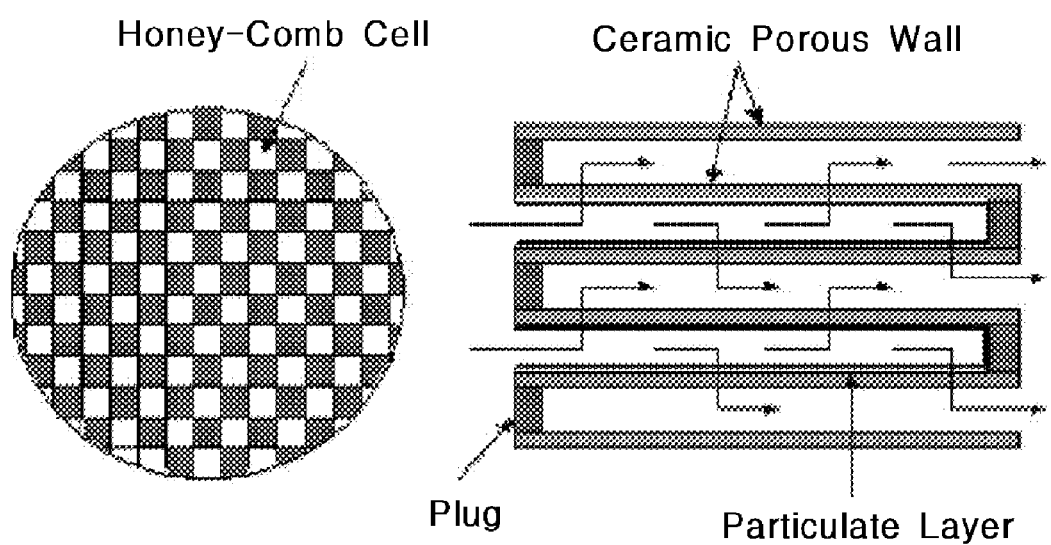
FIG. 1 shows an outlined diagram of a DPF applied in the present invention.
Figure 2:
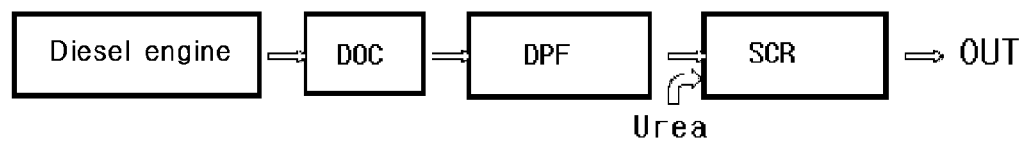
FIG. 2 shows one embodiment of conventional DOC, DPF and urea-SCR arrangement.
Figure 3:
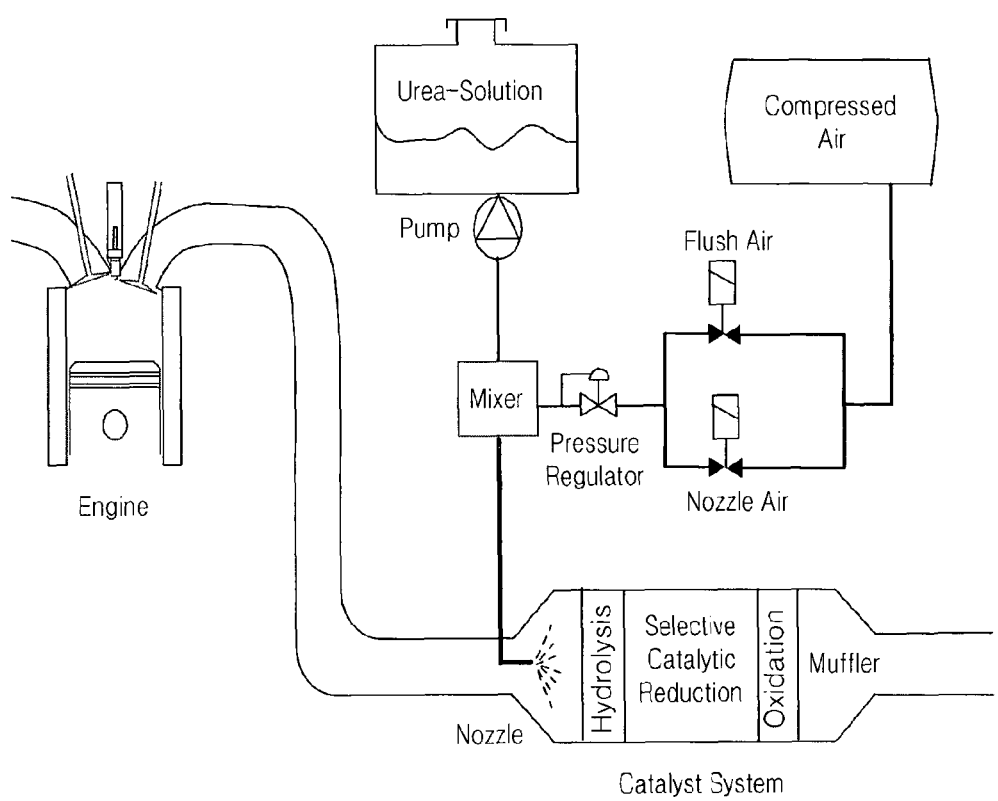
FIG. 3 shows a detailed diagram of a urea-SCR module.

A typical diesel particulate filter module is a filter for trapping particulate material (PM) released from a diesel engine. There are various systems of filters disclosed previously, including ceramic monolith filter, ceramic fiber filter, sintered metal filter and the like. Most preferable module is a ceramic monolith filter comprised of porous ceramic such as cordierite, also called ceramic wall-flow filter. It is closed alternatively at inlet and outlet ends of a channel in this module, thus passes inflow of exhaust gas through a porous wall due to the closed outlet end, and then releases the gas through the outlet end of the adjacent channel. Also, it can absorb particulate material in the inflow channel. FIG. 1 shows the front view of a ceramic monolith inlet and the sectional view of exhaust gas flow. The pore size of wall is regarded as an important factor to select the type of module, since it influences on a diameter of trapped particulates and back pressure of an engine directly. Preferably, the pore size of wall is set to about 10 μm. In such a porous structure, PM has preferably 0.01 μm or more of particulate diameter and is removed in 85% or more of ratio. The PM absorbed in the filter, is ignited within as short a time as possible and the filter is regenerated to a state available to trap PM again. Especially, this module can decrease ignition temperatures to about 250° C., compared to 550 to 600° C., depending upon the manner of applying catalysts in the channel of the filter.

A DPF is placed in the downstream of DOC module to absorb particulate material. In a process for regeneration, it can easily reach firing temperatures of particulate material being captured, because of an exothermic reaction of DOC placed in the downstream. In addition, hydrogen is introduced at the front end of DPF, further improves the oxidation condition of trapped particles, and maximizes DPF efficiency.

3) HC-SCR (HC-Selective Catalytic Reduction)

HC, a reducing agent reacts with $NO_x$ selectively to produce $N_2$, $CO_2$, water ($H_2O$). Indeed, a system that lessens $NO_x$ by using HC of exhaust gas, can be applied. Also, directly designed methods comprising methods for modifying a diesel engine or methods for spraying HC to a discharging device can be used, but not limited to. Two groups of typical catalysts including Cu/ZSM5 and Pt/Al$_2$O$_3$ are usually utilized.

In the present invention, HC-SCR is a module that reduces and lessens NO$_x$ selectively by HC within exhaust gas of an engine, and formed in the downstream of a DPF. Hydrogen gas introduced at the front end of a module becomes an extra reducing agent to reduce NO$_x$. Especially, it can operate a reaction of reduction even at a low temperature so as to improve the efficiency of HC-SCR module.

4) LNT (Lean NO$_x$ Trap)

Figure 5:
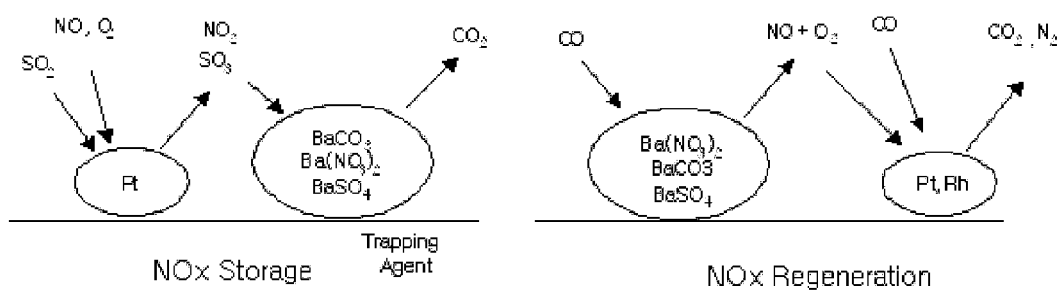
FIG. 5 shows a mechanism of LNT module schematically.

NO$_x$ is captured at a lean area and released (regenerated) at a rich area and then, NO$_x$ is converted to nitrogen and carbon dioxide by using a catalyst. That is to say, as illustrated in FIG. 5, LNT module is defined as a module that reduces nitrogen oxides through two stages.

For storage material of nitrogen oxides, Ba, Sr, K and the like are utilized. At a lean area, NO is changed to NO$_2$ by using Pt and stored within a NO$_x$ trap. When reaching a rich spike with aids of HC and CO components, NO$_x$ stored within the NO$_x$ trap is reduced to N$_2$.

According to the present invention, the LNT module is a module that removes nitrogen oxides and is able to displace the HC-SCR module. It is understood that hydrogen gas introduced at the front end of a module affects a NO$_x$ reduction by HC and CO under a condition of rich spike, namely under a condition of NO$_x$ recycling.

Besides, the LNT module of the present invention is displaced with a DOC module, and finally, a system comprising LNT-DPF in a serial mode can be provided.

5) Ammonolysis Module

According to the present invention, elements that are introduced from a storage container installed in a transport means are processed by hydrolysis of urea and ammonolysis to generate hydrogen. Urea is stored in a storage container with a solid form and/or liquid form of urea solution, and sprayed to produce ammonia by thermolysis and/or hydrolysis. In the case of thermolysis, urea ((NH$_2$)$_2$CO) is converted to ammonia and isocyanic acid (HCNO) thermally and thereafter, they are hydrolyzed. Herein, isocyanic acid reacts with water to form ammonia and carbon dioxide.

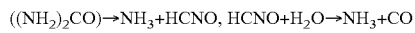

$$((NH_2)_2CO) \rightarrow NH_3 + HCNO, \quad HCNO + H_2O \rightarrow NH_3 + CO_2$$

The resulting ammonia is degraded by using catalysts of ammonolysis so as to generate hydrogen.

In the ammonolysis module, conventional hydrolytic catalysts and ammonolytic catalysts can be united or separated on a typical carrier. Thus, the resulting structure coated with above may be assembled, and depending upon requirements, provided for DOC, DPF, SCR and/or LNT modules with an electronic controller.

Hereinafter, processes for operating the systems will be described clearly.

Exhaust gas discharged from a diesel engine contains CO, HC, NO$_x$, particulate material (PM) and the like. As depicted in FIG. 4, CO, HC and NO substances are oxidized to O$_2$ and NO$_2$ when passing through a DOC. In this stage, hydrogen gas produced from an ammonolysis module may lessen LOT at the inside of a DOC to thereby improve oxidation conditions of HC and CO. This results in an exothermic reaction and smoothly promotes DPF recycling in the downstream. Once passing through a DOC, PM within exhaust gas is trapped in the downstream. Especially for a DPF recycling, NO$_2$ produced in the DOC may decrease recycling temperatures considerably in a DPF to remove particulate material.

Moreover, hydrogen introduced at the front end of DPF may improve oxidation conditions of captured particles, and maximize DPF efficiencies.

According to one embodiment of the present invention, most of NO$_x$ reach a HC-SCR module after being released from exhaust gas of a DPF, and then, are removed by way of a selective reduction. Particularly, hydrogen introduced at the front end can reduce nitrogen oxides into nitrogen gas when passing through a SCR, since it enables as an ancillary reducing agent an optimally selective reduction by catalysts.

According to another embodiment of the present invention, the HC-SCR can be displaced with a LNT module. As described above, most of NO$_x$ are adsorbed in a LNT after being released from exhaust gas of a DPF. Then, hydrogen gas that is introduced at the front end under a rich condition, can reduce NO$_x$ to nitrogen with HC and CO through a recycling process of a DPF. As a result, whole system efficiency may become better.

According to another embodiment of the present invention, whole system can be composed of a LNT-DPF module placed in a serial mode since a LNT displaces a DOC module. In such a system, nitrogen oxide components of exhaust gas released from an engine are adsorbed on the LNT. Then, hydrogen gas that is introduced at the front end under a rich condition, can reduce NO$_x$ to nitrogen along with HC and CO through a recycling process of a LNT, and coincidentally, it generates discharge gas at a high temperature. As a consequence, the following process of recycling a DPF module in the downstream can be accomplished more effectively.

As illustrated above, the present invention provides methods for post-processing exhaust gas, wherein hydrogen gas is applied. Particularly, in the present invention, hydrogen gas is derived from urea and urea is an existing element installed within a transport means in which urea-SCR is used. Therefore, the former systems can be modified so as to generate hydrogen as follows. The ammonolytic module coated with hydrolytic catalysts and ammonolytic catalysts in a united or separated mode, is installed at the bottom of a urea storage container.

In this specification, various examples wherein hydrogen gas derived from urea is applied for methods for post-processing exhaust gas, are illustrated, but the present invention is not limited to.

Although the foregoing invention has been described in some detail by way of illustration and examples for purposes of clarity of understanding, it will be readily apparent to those of ordinary skill in the art in light of the teachings of this invention that certain changes and modifications may be made thereto without departing from the spirit or scope of the appended claims. To particularly point out and distinctly claim the subject matter regarded as invention, the following claims conclude this specification.

What is claimed is:

1. A device for discharging exhaust gas from a diesel engine comprising: a DOC module, a DPF module, an HC-SCR module, a LNT module, or a combination thereof, serially according to a flow of exhaust gas; and an ammonolysis module, wherein the ammonolysis module converts urea into hydrogen gas which is injected into the DOC module, DPF module, HC-SCR module, LNT module, or a combination thereof.

2. A method of improving the operation of a diesel engine exhaust gas processing system, the system having a DOC module, a DPF module, an HC-SCR module, an LNT module, or a combination thereof, the method comprising: injecting hydrogen gas into the DOC module, the DPF module, the HC-SCR module, the LNT module, or a combination thereof, wherein the hydrogen gas is generated by the conversion of urea in an ammonolysis module.

3. A method for purifying an exhaust gas, comprising:

providing urea to an ammonolysis module that converts urea into hydrogen gas; and injecting the hydrogen gas into a DOC module, a DPF module, an HC-SCR module, an LNT module, or a combination thereof, wherein the DOC module, DPF module, HC-SCR module, LNT module, or combination thereof is processing an exhaust gas comprising an amount of a contaminant;

thereby reducing the amount of the contaminant in the exhaust gas.

4. The method of claim 3, wherein the exhaust gas comprises the exhaust gas from a diesel engine.

5. The method of claim 3, wherein the contaminant is a nitrogen oxide.

* * * * *